United States Patent
Chen et al.

(10) Patent No.: US 9,774,910 B2
(45) Date of Patent: Sep. 26, 2017

(54) METHOD AND APPARATUS FOR EVALUATING MEDIA DELIVERY QUALITY

(71) Applicant: Huawei Technologies Co., Ltd., Shenzhen (CN)

(72) Inventors: Bing Chen, Shenzhen (CN); Qingpeng Xie, Shenzhen (CN); Lei Zhang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 303 days.

(21) Appl. No.: 14/302,712

(22) Filed: Jun. 12, 2014

(65) Prior Publication Data

US 2014/0298366 A1    Oct. 2, 2014

Related U.S. Application Data

(63) Continuation of application No. PCT/CN2012/087911, filed on Dec. 28, 2012.

(30) Foreign Application Priority Data

Dec. 30, 2011    (CN) .......................... 2011 1 0456516

(51) Int. Cl.
*H04N 21/442*    (2011.01)
*H04N 21/61*    (2011.01)
(Continued)

(52) U.S. Cl.
CPC ....... *H04N 21/442* (2013.01); *H04L 65/1069* (2013.01); *H04L 65/1076* (2013.01);
(Continued)

(58) Field of Classification Search
None
See application file for complete search history.

(56) References Cited

U.S. PATENT DOCUMENTS 7,337,231 B1 * 2/2008 Li .......................... H04L 1/0006
709/231
7,779,142 B1 * 8/2010 Greene ............... H04L 12/2801
370/235
(Continued)

FOREIGN PATENT DOCUMENTS

CN    101282348 A    10/2008
CN    101287122 A    10/2008
(Continued)

OTHER PUBLICATIONS

Mok, R., et al., "Measuring the Quality of Experience of HTTP Video Streaming," 12th IFIP/IEEE IM 2011: Mini Conference, May 23, 2011, pp. 485-492.

(Continued)

*Primary Examiner* — Mohammad J Rahman
(74) *Attorney, Agent, or Firm* — Conley Rose, P.C.

(57) ABSTRACT

A method and an apparatus are provided for evaluating media delivery quality that relate to the field of communications technologies and that can directly reflect a variation of media delivery quality and a variation of subjective experience of a user on media play quality. A method for evaluating media delivery quality includes: receiving media data, and measuring a data amount of the media data received within the period of time; parsing the media data, and acquiring a play rate of the media data; simulating, a decoding buffer in a process of playing the media data received within the period of time, to acquire a virtual decoding buffer and acquire a size of the virtual decoding buffer; and determining, according to the size of the virtual decoding buffer, whether a pause occurs in the process of playing the media data received within the period of time.

12 Claims, 7 Drawing Sheets

(51) Int. Cl.
  *H04L 29/06* (2006.01)
  *H04N 21/24* (2011.01)
  *H04N 21/25* (2011.01)
  *H04N 21/647* (2011.01)

(52) U.S. Cl.
  CPC .......... *H04L 65/4084* (2013.01); *H04L 65/80* (2013.01); *H04N 21/2401* (2013.01); *H04N 21/2407* (2013.01); *H04N 21/251* (2013.01); *H04N 21/6131* (2013.01); *H04N 21/64738* (2013.01)

(56) References Cited

U.S. PATENT DOCUMENTS

| | | | |
|---|---|---|---|
| 7,830,804 B2 | 11/2010 | Kavanaugh et al. | |
| 7,873,727 B2 | 1/2011 | Pal et al. | |
| 7,962,637 B2* | 6/2011 | Su | H04N 21/234363 709/230 |
| 8,135,852 B2* | 3/2012 | Nilsson | H04L 29/06 709/230 |
| 9,032,427 B2* | 5/2015 | Gallant | H04L 41/5038 725/9 |
| 2002/0152305 A1* | 10/2002 | Jackson | H04L 12/26 709/224 |
| 2003/0200548 A1* | 10/2003 | Baran | H04L 29/06027 725/90 |
| 2003/0236904 A1* | 12/2003 | Walpole | H04L 12/1881 709/231 |
| 2004/0230651 A1* | 11/2004 | Ivashin | H04L 29/06027 709/204 |
| 2005/0047333 A1* | 3/2005 | Todd | H04L 12/2602 370/229 |
| 2005/0144640 A1* | 6/2005 | Fritsch | H04H 20/40 725/58 |
| 2006/0130107 A1* | 6/2006 | Gonder | H04L 29/06027 725/110 |
| 2007/0019547 A1* | 1/2007 | Ho | H04L 12/6418 370/230 |
| 2007/0043875 A1* | 2/2007 | Brannon | H04N 21/23608 709/231 |
| 2007/0047586 A1* | 3/2007 | Tieman | H04H 60/97 370/486 |
| 2007/0128899 A1* | 6/2007 | Mayer | G06F 9/4406 439/152 |
| 2008/0069002 A1* | 3/2008 | Savoor | H04L 29/06027 370/241 |
| 2008/0101254 A1* | 5/2008 | Chew | H04L 12/2602 370/252 |
| 2008/0177994 A1* | 7/2008 | Mayer | G06F 9/4418 713/2 |
| 2009/0034610 A1* | 2/2009 | Lee | H04N 21/23406 375/240.02 |
| 2009/0083431 A1* | 3/2009 | Balachandran | G06F 15/16 709/228 |
| 2009/0097413 A1* | 4/2009 | Todd | H04L 12/2602 370/253 |
| 2010/0115605 A1* | 5/2010 | Beattie | H04L 12/5695 726/15 |
| 2011/0085605 A1 | 4/2011 | Xie et al. | |
| 2011/0249127 A1 | 10/2011 | Zhang et al. | |
| 2012/0110167 A1* | 5/2012 | Joch | H04N 21/2401 709/224 |
| 2012/0117225 A1* | 5/2012 | Kordasiewicz | H04L 65/1083 709/224 |
| 2013/0343222 A1 | 12/2013 | Chen et al. | |
| 2014/0105115 A1* | 4/2014 | Ohayon | H04N 21/2187 370/328 |

FOREIGN PATENT DOCUMENTS

| | | |
|---|---|---|
| CN | 101309400 A | 11/2008 |
| CN | 101635846 A | 1/2010 |
| CN | 102118270 A | 7/2011 |
| EP | 2670084 A1 | 12/2013 |

OTHER PUBLICATIONS

Hubbe, P., et al., "An Innovative Tool for Measuring Video Streaming QoE," TechZine, Alcatel-Lucent, Jan. 12, 2011, 7 pages.

Reibman, A., et al., "Video Quality Estimation for Internet Streaming," Jan. 1, 2004, pp. 1168-1169.

Foreign Communication From a Counterpart Application, European Application No. 12861750.3, Extended European Search Report dated Oct. 28, 2014, 12 pages.

Partial English Translation and Abstract of Chinese Patent Application No. CN101282348A, Jul. 28, 2014, 8 pages.

Welch, J., et al., "A Proposed Media Delivery Index (MDI)," RFC 4445, Apr. 2006, 10 pages.

"3rd Generation Partnership Project; Technical Specification Group Services and System Aspects; Transparent end-to-end Packet-switched Streaming Service (PSS); Protocols and Codecs (Release 7)," 3GPP TS 26.234, V7.4.0, Sep. 2007, 149 pages.

"Speech and multimedia Transmission Quality (STQ); QoS aspects for popular services in GSM and 3G networks; Part 2: Definition of Quality of Service Parameters and their computation," ETSI TS 102 250-2, V1.7.1, Oct. 2009, 231 pages.

Foreign Communication From a Counterpart Application, PCT Application No. PCT/CN2012/087911, English Translation of International Search Report dated Apr. 4, 2013, 2 pages.

Foreign Communication From a Counterpart Application, PCT Application No. PCT/CN2012/087911, English Translation of Written Opinion dated Apr. 4, 2013, 7 pages.

\* cited by examiner

METHOD AND APPARATUS FOR EVALUATING MEDIA DELIVERY QUALITY

CROSS-REFERENCE TO RELATED APPLICATIONS

This application is a continuation of International Application No. PCT/CN2012/087911, filed on Dec. 28, 2012, which claims priority to Chinese Patent Application No. 201110456516.3, filed on Dec. 30, 2011, both of which are hereby incorporated by reference in their entireties.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present invention relates to the field of communications technologies, and in particular, to a method and an apparatus for evaluating media delivery quality.

BACKGROUND

In a multimedia service, video stream transmission has not only a high requirement for network bandwidth but also has low tolerance for delay, jitter, and packet loss, which, accordingly, imposes a unique requirement on a network device used for video stream transmission. At present, a media stream delivery quality index, such as Media Delivery Index (MDI) defined in the Request for Comments (RFC) 4445 standard may be used to measure a user's expected quality of experience of a video at a network level, in order to effectively evaluate a multimedia service support capability of a network device. The quality of experience (QoE) is a subjective feeling of an end user on service performance provided by a mobile network. The QoE can indicate experience and feeling of an end user on a service and a network by using an approximate quantification method, and reflect a gap between the current service and network quality and the user's expectation.

The MDI is not affected by a video coding scheme and is a simple and extensible measurement scheme. However, the MDI is more suitable for an application scenario in which the User Datagram Protocol (UDP) is used as a transmission protocol. At present, the most widely used HyperText Transfer Protocol (HTTP) video is based on the Transmission Control Protocol (TCP), and the MDI cannot be well applied in an application scenario in which the TCP is used as a transmission protocol. The reason is that the MDI includes two parameters, namely, delay factor (DF) and media loss rate (MLR). A calculation of the DF in the MDI converts a network jitter to a requirement for media stream decoding buffering but a converted result cannot directly reflect a variation of the subjective experience. The MLR is not significant for the evaluation of the subjective experience. Therefore, the QoE of an HTTP video cannot be directly acquired by using the MDI measurement scheme.

SUMMARY

A technical issue to be resolved by the present invention is to provide a method and an apparatus for evaluating media delivery quality, which are capable of directly reflecting a variation of media delivery quality and a variation of subjective experience of a user on media play quality.

To resolve the foregoing technical issue, embodiments of the present invention use the following technical solutions. A method for evaluating media delivery quality includes: receiving media data within a period of time, and measuring a data amount of the media data received within the period of time; parsing the media data, and acquiring a play rate of the media data; simulating, according to the data amount of the media data received within the period of time and the play rate of the media data, a decoding buffer in a process of playing the media data received within the period of time, to acquire a virtual decoding buffer and acquire a size of the virtual decoding buffer; and determining, according to the size of the virtual decoding buffer, whether a pause occurs in the process of playing the media data received within the period of time.

An embodiment of the present invention provides a method for evaluating media delivery quality of a radio cell includes: measuring a data amount of media data received by each user in the radio cell within a period of time and a data amount of media data received by the radio cell within the period of time; parsing the media data received by the radio cell, and acquiring a play rate of the media data and media data traffic required by the radio cell; simulating, according to the data amount of the media data received by each user in the radio cell within the period of time and the play rate of the media data, a decoding buffer in a process of playing the media data received by each user in the radio cell within the period of time, to acquire a virtual decoding buffer of each user and acquire a size of the virtual decoding buffer of each user, and simulating, according to the data amount of the media data received by the radio cell within the period of time and the media traffic required by the radio cell, a decoding buffer in a process of playing the media data received by the radio cell within the period of time, to acquire a virtual decoding buffer of the radio cell and acquire a size of the virtual decoding buffer of the radio cell; determining, according to the size of the virtual decoding buffer of each user, whether a pause occurs in the process of playing the media data received by each user in the radio cell within the period of time, and determining, according to the size of the virtual decoding buffer of the radio cell, whether a pause occurs in the process of playing the media data received by the radio cell within the period of time; acquiring a subjective experience score of each user in the radio cell according to whether a pause occurs in the process of playing the media data received by each user in the radio cell within the period of time, and acquiring a subjective experience score of a radio cell resource according to whether a pause occurs in the process of playing the media data received by the radio cell within the period of time; acquiring a user satisfaction rate of the radio cell by using the subjective experience score of each user in the radio cell; and evaluating media data delivery quality of the radio cell according to the subjective experience score of the radio cell resource and the user satisfaction rate of the radio cell.

An embodiment of the present invention provides an apparatus for evaluating media delivery quality includes: a measurement unit configured to receive media data within a period of time, and measure a data amount of the media data received within the period of time; a parsing unit configured to parse the media data, and acquire a play rate of the media data; a calculation simulating unit configured to simulate, according to the data amount of the media data received within the period of time and the play rate of the media data, a decoding buffer in a process of playing the media data received within the period of time, to acquire a virtual decoding buffer and acquire a size of the virtual decoding buffer; and a determining unit configured to determine, according to the size of the virtual decoding buffer, whether a pause occurs in the process of playing the media data received within the period of time.

An embodiment of the present invention provides an apparatus for evaluating media delivery quality of a radio cell includes: a cell measurement unit configured to measure a data amount of media data received by each user in the radio cell within a period of time and a data amount of media data received by the radio cell within the period of time; a cell parsing unit configured to parse the media data received by the radio cell, and acquire a play rate of the media data and media data traffic required by the radio cell; a cell calculation simulating unit configured to simulate, according to the data amount of the media data received by each user in the radio cell within the period of time and the play rate of the media data, a decoding buffer in a process of playing the media data received by each user in the radio cell within the period of time, to acquire a virtual decoding buffer of each user and acquire a size of the virtual decoding buffer of each user, and simulate, according to the data amount of the media data received by the radio cell within the period of time and the media traffic required by the radio cell, a decoding buffer in a process of playing the media data received by the radio cell within the period of time, to acquire a virtual decoding buffer of the radio cell and acquire a size of the virtual decoding buffer of the radio cell; a cell determining unit configured to determine, according to the size of the virtual decoding buffer of each user, whether a pause occurs in the process of playing the media data received by each user in the radio cell within the period of time, and determine, according to the size of the virtual decoding buffer of the radio cell, whether a pause occurs in the process of playing the media data received by the radio cell within the period of time; a cell subjective experience score calculating unit configured to acquire a subjective experience score of each user in the radio cell according to whether a pause occurs in the process of playing the media data received by each user in the radio cell within the period of time, and acquire a subjective experience score of a radio cell resource according to whether a pause occurs in the process of playing the media data received by the radio cell within the period of time; a cell user satisfaction rate calculating unit configured to acquire a user satisfaction rate of the radio cell by using the subjective experience score of each user in the radio cell; and a cell quality evaluating unit configured to evaluate media data delivery quality of the radio cell according to the subjective experience score of the radio cell resource and the user satisfaction rate of the radio cell.

The evaluation methods and apparatuses provided in the embodiments of the present invention simulate, according to a transmission speed of media data and a decoding speed of the media data acquired by the evaluation device, a size of a virtual decoding buffer (that is, a throughput factor) in a process of playing the media data at the foregoing data transmission speed and decoding speed, determine whether a pause occurs in the process of playing the media data, and reflect, according to whether a pause occurs in the process of playing the media data, a variation of subjective experience of a user on the media data.

BRIEF DESCRIPTION OF THE DRAWINGS

To describe the technical solutions in the embodiments of the present invention more clearly, the following briefly introduces the accompanying drawings required for describing the embodiments. The accompanying drawings in the following description show merely some embodiments of the present invention, and a person of ordinary skill in the art may still derive other drawings from these accompanying drawings without creative efforts.

DETAILED DESCRIPTION

The following clearly describes the technical solutions in the embodiments of the present invention with reference to the accompanying drawings in the embodiments of the present invention. The described embodiments are merely a part rather than all of the embodiments of the present invention. All other embodiments obtained by a person of ordinary skill in the art based on the embodiments of the present invention without creative efforts shall fall within the protection scope of the present invention.

Figure 2:
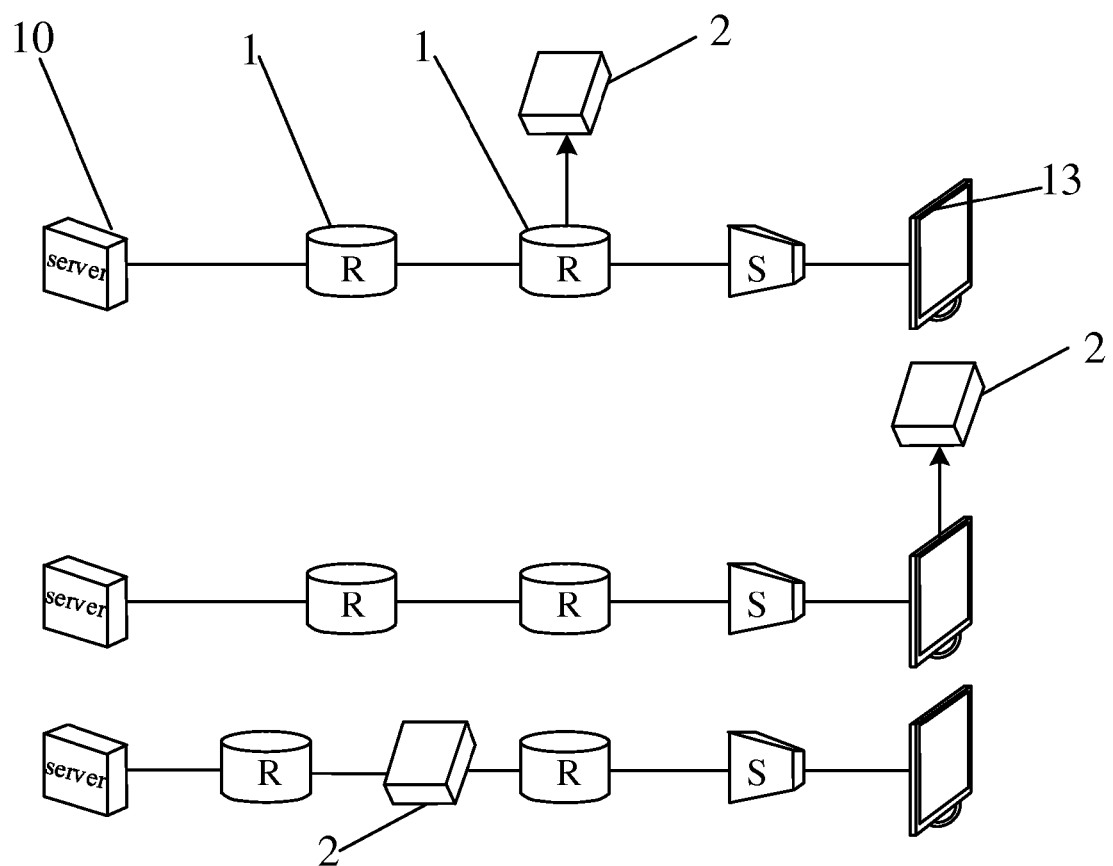
FIG. 2 is a schematic diagram showing a set position of a measurement point according to an embodiment of the present invention.

On a media data transmission network, as shown in FIG. 2, media data is sent from a sending end 10 of the media data, reaches a network terminal 13 via a plurality of network devices such as a network node 1, a switch, and a router on the network, and is played by the network terminal 13.

Embodiment 1

Figure 1:
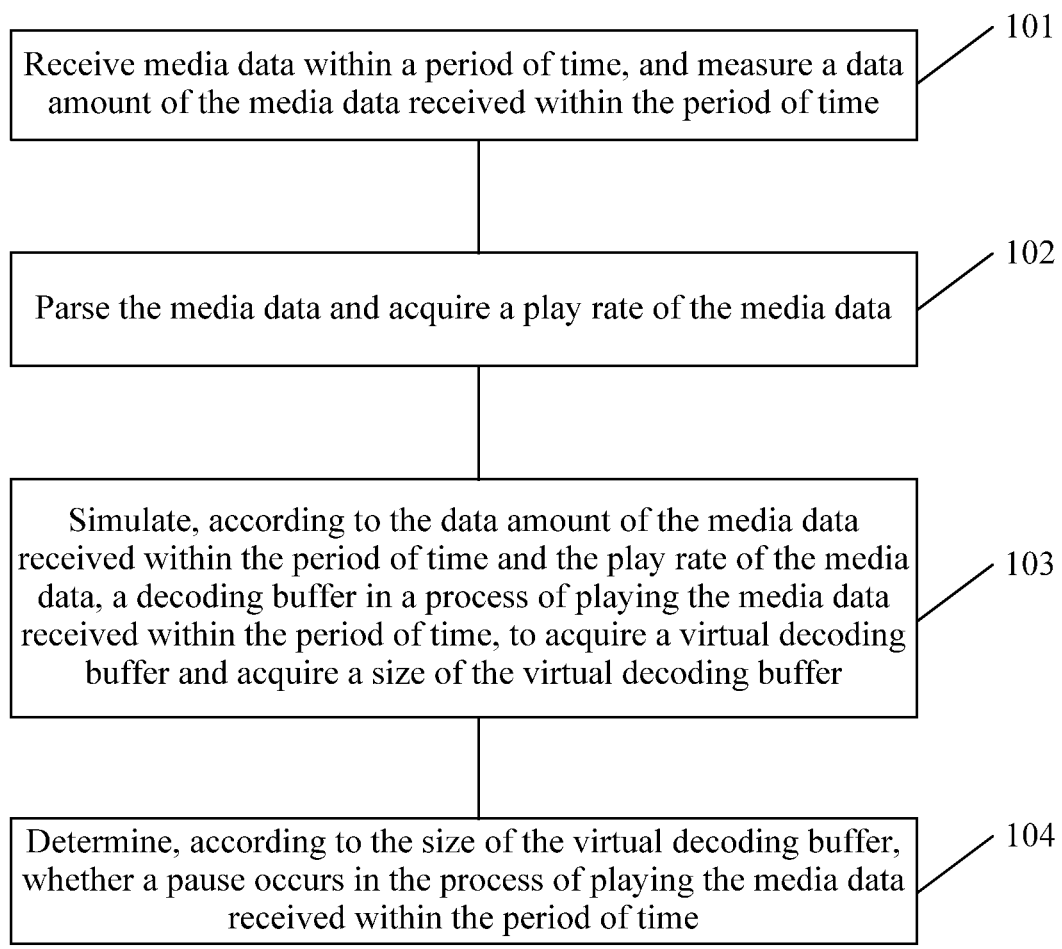
FIG. 1 is a flowchart of a method for evaluating media delivery quality according to an embodiment of the present invention.

This embodiment of the prevent invention provides a method for evaluating media delivery quality. As shown in FIG. 1, the method includes the following steps:

101. Receive media data within a period of time, and measure a data amount of the media data received within the period of time.

First, at least one measurement point is set on a network used for media data transmission. As shown in FIG. 2, an evaluation device 2 is set on the measurement point. The measurement point is used to receive media data, and meanwhile measure the received media data and parse the media data. The measurement point is located on a network node 1 (such as a router or a switch) or a network terminal 13 on the network used for media data transmission.

On the set measurement point, the media data is received within a period of time, the received media data is measured, and the number of bytes of the received media data is measured. The number of bytes of the received media data is a throughput of media data or an effective data amount of the received media data. In the embodiment of the present invention, the evaluation device samples the media data on the network used for media data transmission to implement measurement of the received media data. By sampling in a plurality of continuous sampling periods, the evaluation device acquires a size of data sampled in each sampling period. In other words, on the measurement point, the evaluation device is used to sample, within a period of time (that is, a sampling period within which the evolution device samples the media data), the throughput of media data transmission or the number of bytes of the effective data in a tested system. The effective data amount refers to an amount of data received in a TCP transmission process with continuous serial numbers after out-of-order reordering, and the throughput refers to a maximum rate that can be received by a device in a case of no frame loss.

102. As shown in FIG. 1, parse the media data and acquire a play rate of the media data.

The play rate of the media data refers to a bit rate of the media data. The bit rate of the media data is acquired by parsing the media data, and the bit rate of the media data is a real-time bit rate of the media data or an average bit rate of the media. For example, when the media data is encapsulated by using an flash video (FLV) format, the average bit rate of the media data is acquired by parsing Videodatarate and Audiodatarate in meta data in the FLV file; for another example, when the media data is encapsulated by using a Moving Pictures Expert Group 4 (MP4) format, a duration (a play duration of a video) may be acquired by parsing tkhd box data in an MP4 file, and the total number of samples (video frames or audio frames) and a size of each sample may be acquired by parsing stsz box, thereby acquiring a file size. The average bit rate of the media data may be acquired by using the file size and file play duration, or the real-time bit rate of the media data may be acquired by using stco and stsc.

103. Simulate, according to the data amount of the media data received within the period of time and the play rate of the media data, a decoding buffer in a process of playing the media data received within the period of time, to acquire a virtual decoding buffer and acquire a size of the virtual decoding buffer.

According to the data amount of the media data received within a period of time and the play rate of the media data, a sustainable play time of the media data received within the period of time is acquired. For example, the sustainable play time $T_r(i)$ of the media data is calculated according to the formula $T_r(i)=S(i)/MR(i)$ that is, the sustainable play time of the media data received within the $i^{th}$ sampling period, where $S(i)$ is the media data received within the $i^{th}$ sampling period, and $MR(i)$ is the play rate of the media data.

If any moment within the period of time is within a buffer phase of media data playing, the acquired size of the virtual decoding buffer within the period of time is a sum of the size of the virtual decoding buffer before the period of time and the sustainable play time of the media data received within the period of time; and if any moment within the period of time is not within the buffer phase of media data playing, the acquired size of the virtual decoding buffer within the period of time is a difference between the sum of the size of the virtual decoding buffer before the period of time and the sustainable play time of the media data received within the period of time and a duration of the period of time.

In the embodiment of the present invention, media data delivery quality is evaluated on a network node (such as a router or a switch) on a network for media data transmission by using a method of simulating a feature of media data playing instead of performing real media data playing, to learn a situation of media data playing on a terminal, that is, simulating, according to a transmission speed of the media data and a decoding speed of the media data acquired by the evaluation device, a size of a virtual decoding buffer when the media data is played at the foregoing data transmission speed and decoding speed; where the decoding buffer is used to, when the media data is played, temporarily store the decoded media data for playing and output the data to a media play device, so that the media data can be played. If no data exists in the decoding buffer, video playing is paused, and a system performs data buffering, that is, storing data in the decoding buffer. After certain data is stored in the decoding buffer, the playing continues. Data buffering time is predetermined in the system.

As shown in formula $$BL(i) = \begin{cases} 0 & i = 0 \\ BL(i-1) + T_r(i) & 0 < i < t_1 \\ BL(i-1) + T_r(i) - T_s(i) & i > t_1, \end{cases}$$

BL is a size of the virtual decoding buffer, $T_s$ is time consumed for playing the media data within a sampling period, BL is measured in milliseconds, i is the $i^{th}$ sampling period, and t1 is a buffering phase. When i=0, that is, when sampling media data on a media data transmission network is not performed, the size of the virtual decoding buffer is 0. Because the video playing is paused during a process of data buffering, if the time for sampling the data on the network by the evaluation device is within the process of data buffering (that is, the current sampling period is within the data buffering phase, $0 \le i \le t_1$) the size of the virtual decoding buffer within the period of time is a sum of the size of the virtual decoding buffer before the period of time (that is, the size of the virtual decoding buffer in the previous sampling period, BL (i−1)) and sustainable play time of the media data within the period of time. However, if the time for sampling the data on the network by the evaluation device is not within the process of data buffering (that is, the current sampling period is not within the data buffering phase, i>t), when being continuously stored in the virtual decoding buffer, the media data is further continuously output by the virtual decoding buffer to a playing device for playing. Therefore, in this case, the size of the virtual decoding buffer is a difference between a sum of the size of the virtual decoding buffer before the period of time and the sustainable play time of the media data within the period of time and the time consumed for playing the media data within the period of time. According to the foregoing formula and further according to an acknowledged fact whether the media data playing is paused or not, a sampling period i within which the pause occurs is acquired, that is, the time when the pause occurs is acquired.

104. Determine, according to the size of the virtual decoding buffer, whether a pause occurs in the process of playing the media data received within the period of time.

When no media data exists in the decoding buffer during a process of playing the media data, the media data playing is paused. Therefore, if the size of the virtual decoding buffer within the period of time is larger than 0, it is determined that the media data is normally played within the period of time; and if the size of the virtual decoding buffer within the period of time is smaller than or equal to 0, it is determined that the media data is played with a pause within the period of time.

In the embodiment of the present invention, the size of the virtual decoding buffer, which is simulated according to the media data and the decoding speed of the media data acquired by the evaluation device and when the media data is played with the foregoing data amount and at the decoding speed, is named throughput factor. If the throughput factor is greater than 0, it is determined that the media data is normally played; if the throughput factor is smaller than or equal to 0, it is determined that the media data is played with a pause. The throughput factor within a period of time is determined mainly according to an amount of data received by the evaluation device within the period of time. If the amount of the received data is large, the throughput factor is large; and on the contrary, if the amount of the received data is small, the throughput factor becomes small accordingly. Therefore, a transmission rate condition of the media data can be reflected according to the throughput factor.

Meanwhile, when the throughput factor is smaller than or equal to 0, that is, when no data exists in the virtual decoding buffer, the media data playing is paused. In this case, a viewer may see a pause during the media data playing. The fluency of media data playing is downgraded, thereby affecting the viewer's viewing effect. In this case, a subjective experience of the viewer is downgraded. Therefore, according to the throughput factor, that is, a variation of the size of the virtual decoding buffer, a variation of the subjective experience of the viewer within a period can be determined when the media data is played and seen by the viewer at the transmission rate within the period of time. That is, if the throughput factor is greater than 0, it indicates that the network transmission is stable and the subjective experience remains unchanged; and if the throughput factor is smaller than or equal to 0, it indicates that the subjective experience is downgraded. In this case, an operator may perform a corresponding check and adjustment on the media data transmission network according to the situation.

In the embodiment of the present invention, according to the transmission speed of the media data and the decoding speed of the media data acquired by the evaluation device, a size of a virtual decoding buffer (that is, a throughput factor) in the process of playing the media data at the foregoing data transmission speed and decoding speed is simulated, and it is determined whether a pause occurs in the process of playing the media data; and because whether the media data playing is paused can directly reflect a variation of subjective experience of a user on the media data in this case, the variation of subjective experience of the user can be learnt.

Further, in the embodiment of the present invention, after it is determined, according to the size of the virtual decoding buffer, whether a pause occurs in the process of playing the media data, according to the time when the pause occurs in the process of playing the media data, a duration of the pause in the process of playing the media data, a duration of an interval between two pauses in the process of playing the media data, and a duration of media data playing between the two pauses in the process of playing the media data are acquired.

The subjective experience score on the media data playing at a moment is acquired according to the formula MOS=$a_1$×Duration+$a_2$×Interval+$a_3$×PlayTime, where MOS is the subjective experience score, $a_1$, $a_2$, and $a_3$ are constants for calculating the subjective experience score, Duration is the duration of the pause in the process of playing the media data, Interval is the duration of the interval between two pauses that are before the moment and are closest to the moment in the process of playing the media data, and PlayTime is the duration of media data playing between the two pauses that are before the moment and are closest to the moment in the process of playing the media data.

According to the formula $$BL(i) = \begin{cases} 0 & i = 0 \\ BL(i-1) + T_r(i) & 0 < i < t_1 \\ BL(i-1) + T_r(i) - T_s(i) & i > t_1 \end{cases}$$

and an acknowledged fact whether the media data playing is paused or not, a sampling period i within which the pause occurs is acquired, that is, the time when the pause occurs is acquired. For example, a first pause in the process of playing the media data occurs in the i1$^{th}$ sampling period, time when the evaluation device performs the i21$^{th}$ sampling period is t3, the first pause ends, that is, the media data continues to be normally played, at the i2$^{th}$ sampling period, time when the evaluation device performs the i2$^h$ sampling period is t4, a second pause in the process of playing the media data occurs in the i3$^{th}$ sampling period, and time when the evaluation device performs the i3$^{th}$ sampling period is t5, the duration of the pause in the process of playing the media data, that is, Duration, is t4−t3, the duration of the interval between two pauses in the process of playing the media data, that is, Interval, is t5−t3, and the duration of media data playing between the two pauses in the process of playing the media data, that is, PlayTime, is t5−t4. Then, after the values are substituted into the formula MOS=$a_1$×Duration+$a_2$×Interval+$a_3$×PlayTime, a subjective experience score on the media data playing is acquired.

Alternatively, in the embodiment of the present invention, the measuring the media data received within the period of time includes: measuring the number of frames of the received media data. For example, when the media data is encapsulated by using the FLV format, whether a data frame is received may be determined according to a media frame flag acquired by parsing videotag in an FLV file, and the number of frames received within the current sampling period may be acquired by counting the frame flags within the current sampling period; and, for another example, when the media data is encapsulated by using the MP4 format, an offset of each frame in the file may be acquired by counting the number of bytes S(i) (i is the current sampling period) of the received media data and parsing stco and stsc in the media data file, and the number of frames acquired within the current sampling period may be acquired by using the S(i) and a location offset of each frame.

The acquiring a play rate of the media data includes: acquiring a frame rate of the media data. When the media data is encapsulated by using the FLV format, the frame rate of the media data may be acquired by parsing framerate in meta in the FLV file; and when the media data is encapsulated by using the MP4 format, a media frame rate framerate=timescale/sample_delt may be acquired by parsing timescale and sample_delta in the MP4 file.

According to the number of frames and frame rate of the received media data, the sustainable play time of the media data is acquired. That is, according to the formula $T_r(i)$=F(i)/FR(i), the sustainable play time of the media data received within the i$^{th}$ sampling period is acquired, where FR is the frame rate of the media data, F is the number of frames of the media data, and i is the i$^{th}$ sampling period. Then, a size of the virtual decoding buffer is acquired according to the sustainable play time of the media data received within the sampling period. Further, according to the size of the virtual decoding buffer, it is determined whether a pause occurs in the process of playing the media data, or a subjective experience score on the media data playing is further acquired. A specific step is the same as that described above.

Alternatively, when the media data is encapsulated by using a Transport Stream (TS) format, sustainable play time of the media data within a sampling period, that is, $T_r(i)$ =PTS(i,1)−PTS(i,j), may be acquired by parsing a Presentation Timestamp (PTS) of a TS video stream, where PTS (i,1) is the PTS of a first video frame in the $i^{th}$ sampling period, and PTS(i,j) is the PTS of a last video frame in the $i^{th}$ sampling period. Then, a size of the virtual decoding buffer is acquired according to the sustainable play time of the media data received within the sampling period. Further, according to the size of the virtual decoding buffer, it is determined whether a pause occurs in the process of playing the media data, or a subjective experience score on the media data playing is further acquired. A specific step is the same as that described above.

Alternatively, in the embodiment of the present invention, the measuring a data amount of the media data received within the period of time includes: measuring an average arrival duration per frame of the media data received within the period of time, that is, $AvgFTime_i$. A specific process is as follows: if the evaluation device receives n frames of data packets of the media data within a period of time, that is, the $i^{th}$ period of time, during which media data is received, and in this period of time, arrival time of a first data packet of a first frame is t1, and arrival time of a last data packet of a last frame is t2, the acquired average arrival duration per frame is $AvgFTime_i=(t2-t1)/n$. The acquiring a play rate of the media data includes: acquiring a frame rate of the media data. After the parsing the media data and acquiring a play rate of the media data, the method further includes: acquiring a theoretical duration per frame of the media data according to the frame rate of the media data, that is, acquiring the theoretical duration per frame of the media data according to the formula: duration=1000/FR, where duration is the theoretical duration per frame and FR is the frame rate of the media data; acquiring, according to the average arrival duration per frame of the media data, a short pause jitter factor of the media data received within the period of time, that is, acquiring the short pause jitter factor of the media data received within the period of time according to the formula $factor_i=\Sigma(AvgFTime_{i,j}-duration)\times u_j$, where factor, is the short pause jitter factor of the media data received within the period of time, AvgFTime is the average arrival duration per frame of the media data received within the period of time, $u_j$ is a coefficient of the short pause jitter factor, and i is the period of time (that is, the $i^{th}$ period of time); acquiring, according to the subjective experience score of raw data of the media data received within the period of time before transmission and the short pause jitter factor of the media data received within the period of time, the subjective experience score of the media data received within the period of time, that is, acquiring the subjective experience score of the media data received within the period of time by using formula $MOSi=MOSVi\times(1-b1\times factor_i)$, where MOSi is the subjective experience score of the media data received within the period of time, MOSVi is the subjective experience store of the raw data of the media data received within the period of time before transmission, b1 is a coefficient, and factor, is the short pause jitter factor of the media data received within the period of time. Then, a size of the virtual decoding buffer is acquired according to the sustainable play time of the media data received within the sampling period. Further, according to the size of the virtual decoding buffer, it is determined whether a pause occurs in the process of playing the media data, or a subjective experience score on the media data playing is further acquired. A specific step is the same as that described above.

Alternatively, in the embodiment of the present invention, the measuring a data amount of the media data received within the period of time includes: detecting an acknowledgment number in an acknowledgment character packet fed back by a terminal within the period of time, acquiring, by using the acknowledgment number, a data packet of the media data received and acknowledged by the terminal within the period of time, and acquiring, according to the acknowledged data packet, the data amount of the media data received by the terminal within the period of time. Then, the media data is parsed to acquire the frame rate, or average bit rate, or real-time bit rate of the media data. Then, the sustainable play time of the received media data is acquired, and then, according to the size of the virtual decoding buffer, it is determined whether a pause occurs in the process of playing the media data, or the subjective experience score on the media data playing is further acquired. A specific step is the same as that described above. In the embodiment of the present invention, because the evaluation device is set on a network node (such as a router or a switch) on a network for media data transmission, an error is generated between a transmission rate of the media data measured on the network node and a transmission rate of the media data actually received by a network terminal. By using the foregoing method, the transmission rate of the media data received by the network terminal can be accurately acquired on the network node directly, and therefore quality of the media data playing on the network terminal is evaluated.

Further, in the embodiment of the present invention, when the network used for media data transmission encounters a fault, a plurality of measurement points are set on the network used for media data transmission and evaluation is performed on each measurement point to acquire a throughput factor of each point. According to similarities and differences of the throughput factors of all points, a location where the fault occurs can be identified.

Figure 3:
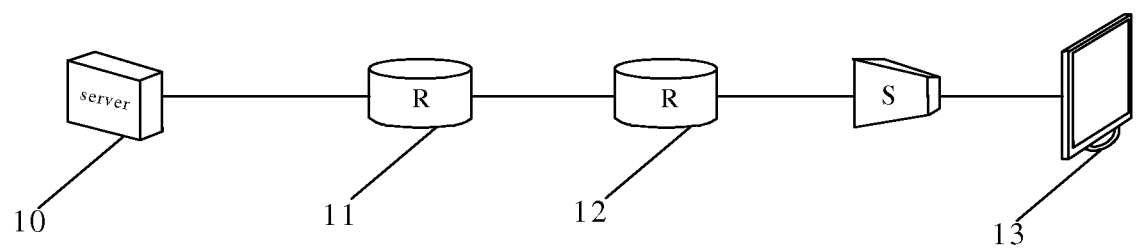
FIG. 3 is a schematic diagram of fault determination according to an embodiment of the present invention.

As shown in FIG. 3, a first measurement point 11 and a second measurement point 12 are set on the network for media data transmission. A section between a sending end 10 and the first measurement point 11 is referred to as a measurement point upstream, and a section between the second measurement point 12 and a network terminal 13 is referred to as a measurement point downstream. Evaluation is simultaneously performed on the first measurement point 11, the second measurement point 12, and the network terminal 13 to acquire throughput factors of the first measurement point 11, the second measurement point 12, and the network terminal 13. If the throughput factors of the first measurement point 11 and the second measurement point 12 are the same and are greater than the throughput factor of the network terminal 13, it may be determined that the fault has occurred in the measurement point downstream; if the throughput factors of the first measurement point 11 and the second measurement point 12 are the same and are smaller than the throughput factor of the network terminal 13, it may be determined that the fault has occurred in the measurement point upstream; if the throughput factors of the first measurement point 11 and the second measurement point 12 are different, it may be determined that the fault has occurred between the first measurement point 11 and the second measurement point 12. The method provided by the embodiment of the present invention is also applicable to other media stream services using TCP for transmission.

In the embodiment of the present invention, according to the transmission speed of the media data and the decoding speed of the media data acquired by the evaluation device, a size of a virtual decoding buffer (that is, a throughput factor) in the process of playing the media data at the foregoing data transmission speed and decoding speed is simulated, it is determined whether a pause occurs in the process of playing the media data, and a subjective experience score is further acquired according to the pause in the process of playing the media data, thereby accurately acquiring, on a network node, a variation and a score of subjective experience of a network terminal on the media data.

Embodiment 2

Figure 4:
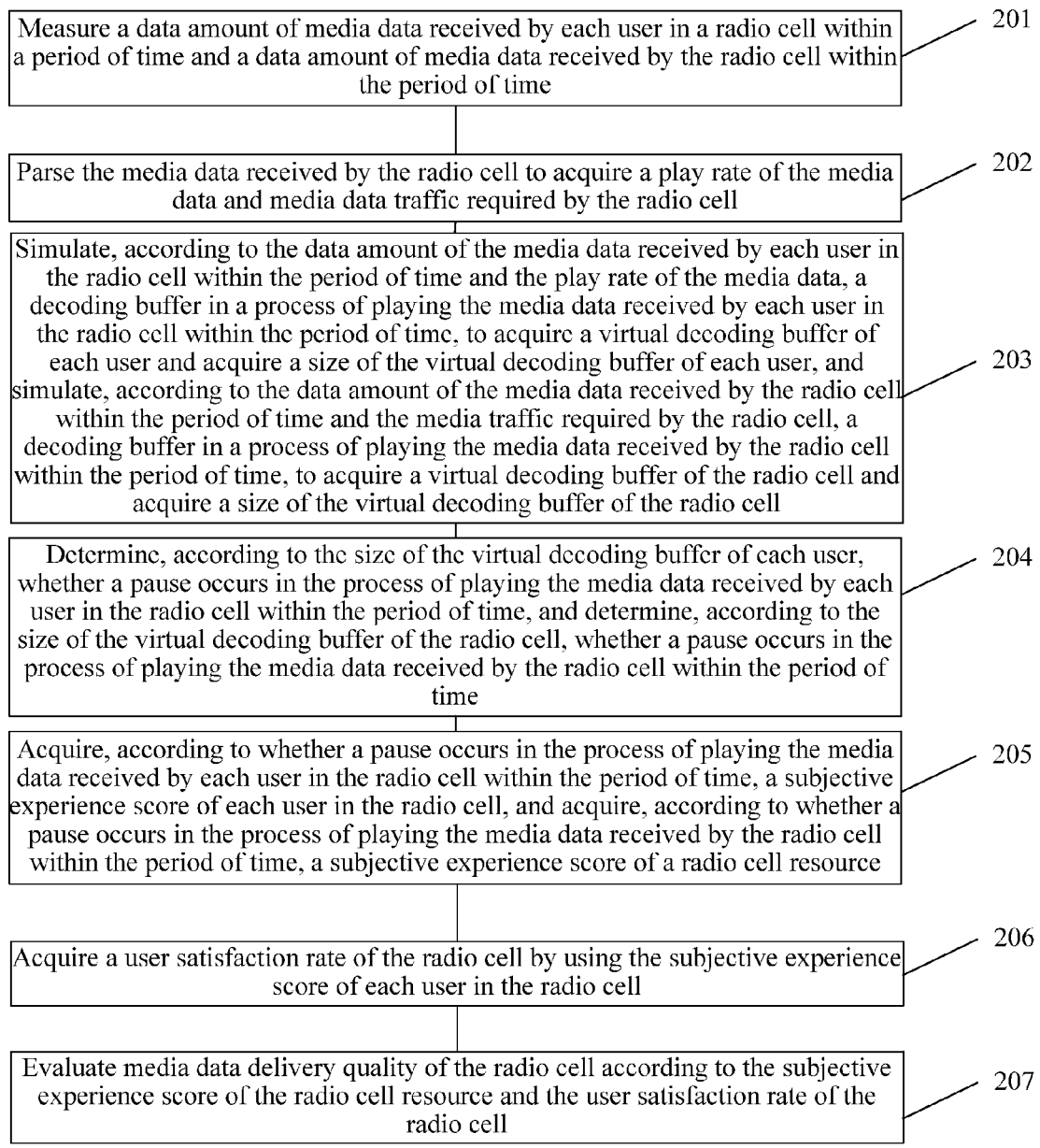
FIG. 4 is a flowchart of a method for evaluating media delivery quality of a radio cell according to an embodiment of the present invention.

This embodiment of the prevent invention provides a method for evaluating media delivery quality of a radio cell. As shown in FIG. 4, the method includes the following steps:

201. Measure a data amount of media data received by each user in the radio cell within a period of time and a data amount of media data received by the radio cell within the period of time.

According to the method for evaluating media delivery quality provided in Embodiment 1 of the present invention, the data amount of the data received by each user among all video service users in a cell is acquired, and then a sum is obtain to acquire the data amount of the media data received by the radio cell within the period of time, that is, the total throughput of media data transmission of the radio cell.

Alternatively, the throughput of the radio cell is calculated by using a radio Key Performance Indicator (KPI). Using the High-Speed Downlink Packet Access (HSDPA) as an example, a User Equipment (UE) class is 10, a reported Channel Quality Indication (CQI) is 30, a physical layer throughput is 1920×15/2 milliseconds (ms)=14.4 megabits per a second (Mbit/s); a Media Access Control-HS (MAC-hs) layer throughput is 25558/2 ms=12.8 Mbit/s; and a Radio Link Control (RLC) layer throughput is (25558/336)×320/2 ms=12.16 Mbit/s. The cell throughput may approximately equal the RLC layer throughput.

202. Parse the media data received by the radio cell to acquire a play rate of the media data and media data traffic required by the radio cell.

According to the method for evaluating media delivery quality provided in Embodiment 1 of the present invention, the media data of each video service user is parsed to acquire a bit rate (average bit rate or real-time bit rate) of the media data, that is, the play rate of the media data. Then, summation is performed to acquire the media traffic required by the radio cell.

203. Simulate, according to the data amount of the media data received by each user in the radio cell within the period of time and the play rate of the media data, a decoding buffer in a process of playing the media data received by each user in the radio cell within the period of time, to acquire a virtual decoding buffer of each user and acquire a size of the virtual decoding buffer of each user, and simulate, according to the data amount of the media data received by the radio cell within the period of time and the media traffic required by the radio cell, a decoding buffer in a process of playing the media data received by the radio cell within the period of time, to acquire a virtual decoding buffer of the radio cell and acquire a size of the virtual decoding buffer of the radio cell.

In the embodiment of the present invention, further, sustainable play time of the media data received by each user within the period of time is acquired according to the data amount of the media data received by each user within the period of time and the play rate of the media data; if any moment within the period of time is within a buffer phase of media data playing, the acquired size of the virtual decoding buffer of the user within the period of time is a sum of the size of the virtual decoding buffer of the user before the period of time and the sustainable play time of the media data received by the user within the period of time; and if any moment within the period of time is not within a buffer phase of media data playing, the acquired size of the virtual decoding buffer of the user within the period of time is a difference between the sum of the size of the virtual decoding buffer of the user before the period of time and the sustainable play time of the media data received by the user within the period of time and a duration of the period of time.

In the embodiment of the present invention, further, sustainable play time of the media data received by the radio cell within the period of time is acquired according to the data amount of the media data received by the radio cell within the period of time and the media data traffic required by the radio cell; if any moment within the period of time is within a buffer phase of media data playing, the acquired size of the virtual decoding buffer of the radio cell within the period of time is a sum of the size of the virtual decoding buffer of the radio cell before the period of time and the sustainable play time of the media data received by the radio cell within the period of time; and if any moment within the period of time is not within a buffer phase of media data playing, the acquired size of the virtual decoding buffer of the radio cell within the period of time is a difference between the sum of the size of the virtual decoding buffer of the radio cell before the period of time and the sustainable play time of the media data received by the radio cell within the period of time and a duration of the period of time.

The size of the virtual decoding buffer of the radio cell is acquired according to the method for evaluating media delivery quality provided in Embodiment 1 of the present invention. To be specific, the sustainable play time of the media data is calculated according to the formula $T_r(i)=TH_c(i)/MR_c(i)$, that is, the sustainable play time of the media data received within the $i^{th}$ sampling period, where $TH_c(i)$ is the throughput of the radio cell within the $i^{th}$ sampling period and $MR_c(i)$ is the media traffic required by the radio cell within the i sampling period.

Then, the size of the virtual decoding buffer of the radio cell, that is, BL, is acquired according to the formula $$BL(i) = \begin{cases} 0 & i = 0 \\ BL(i-1) + T_r(i) & 0 < i < t_1 \\ BL(i-1) + T_r(i) - T_s(i) & i > t_1, \end{cases}$$

where $T_s$ is the time i consumed for playing the media data within the sampling period, i is the $i^{th}$ sampling period, and t1 is the buffering phase.

204. Determine, according to the size of the virtual decoding buffer of each user, whether a pause occurs in the process of playing the media data received by each user in the radio cell within the period of time, and determine, according to the size of the virtual decoding buffer of the radio cell, whether a pause occurs in the process of playing the media data received by the radio cell within the period of time.

According to the method for evaluating media delivery quality provided in Embodiment 1, if the size of the virtual decoding buffer of the user within the period of time is larger than 0, it is determined that the media data of the user is normally played within the period of time; if the size of the virtual decoding buffer of the user within the period of time is smaller than or equal to 0, it is determined that the media data of the user is played with a pause within the period of time; if the size of the virtual decoding buffer of the radio cell within the period of time is larger than 0, it is determined that the media data of the radio cell is normally played within the period of time; and if the size of the virtual decoding buffer of the radio cell within the period of time is smaller than or equal to 0, it is determined that the media data of the radio cell is played with a pause within the period of time. In this case, content in the virtual decoding buffer of the radio cell is exhausted and the transmission rate of the media data of the radio cell cannot meet requirements of all users in the radio cell. As a result, it is determined that the subjective experience on the media data playing of the radio cell is downgraded.

205. Acquire, according to whether a pause occurs in the process of playing the media data received by each user in the radio cell within the period of time, a subjective experience score of each user in the radio cell, and acquire, according to whether a pause occurs in the process of playing the media data received by the radio cell within the period of time, a subjective experience score of a radio cell resource.

Further, according to the method provided in Embodiment 1 of the present invention, according to the time when the pause occurs in the process of playing the media data received by each user, a duration of the pause in the process of playing the media data received by the user, a duration of an interval between two pauses in a media data playing process of the user, and a duration of media data playing between the two pauses in the media data playing process of the user are acquired.

The subjective experience score of the user at a moment is acquired according to the formula $MOS=a_1 \times Duration + a_2 \times Interval + a_3 \times PlayTime$, where MOS is the subjective experience score of the user, $a_1$, $a_2$, and $a_3$ are constants for calculating the subjective experience score, Duration is the duration of the pause in the media data playing process of the user, Interval is the duration of the interval between two pauses that are before the moment and are closest to the moment in the media data playing process of the user, and PlayTime is the duration of media data playing between the two pauses that are before the moment and are closest to the moment in the media data playing process of the user.

According to the time when the pause occurs in the media data playing process of the radio cell, a duration of the pause in the media data playing process of the radio cell, a duration of an interval between two pauses in the media data playing process of the radio cell, and a duration of media data playing between the two pauses in the media data playing process of the radio cell are acquired.

The subjective experience score of the radio cell resource at a moment is acquired according to the formula $MOS=a_1 \times Duration + a_2 \times Interval + a_3 \times PlayTime$, where MOS is the subjective experience score of the radio cell resource, $a_1$, $a_2$, and $a_3$ are constants for calculating the subjective experience score, Duration is the duration of the pause in the media data playing process of the radio cell, Interval is the duration of the interval between two pauses that are before the moment and are closest to the moment in the media data playing process of the radio cell, and PlayTime is the duration of media data playing between the two pauses that are before the moment and are closest to the moment in the media data playing process of the radio cell. In the embodiment of the present invention, the subjective experience score of the radio cell resource is named radio resource factor (RSF), which is used to reflect resource quality of the radio cell, that is, an overall transmission rate of media data of the radio cell. This numerical value indicates whether the radio resource of the tested cell meets an overall requirement of users. The RSF converts a variation of the cell resource to a requirement for media play buffering. When the radio resource meets the overall requirement of users, the RSF is 100; otherwise, the RSF is decreased.

206. Acquire a user satisfaction rate of the radio cell by using the subjective experience score of each user in the radio cell.

Further, in the embodiment of the present invention, the subjective experience score of each user at the moment is separately compared with the subjective experience score of each user before the moment. A user satisfaction rate of the radio cell at the moment is acquired by accounting the number of users in the radio cell whose subjective experience is downgraded, and the user satisfaction rate of the radio cell is acquired by using the number of users whose subjective experience is downgraded. The user satisfaction rate of the radio cell is a difference between 1 and a quotient of the number of users in the radio cell whose subjective experience is downgraded divided by the total number of users in the radio cell, that is, the user satisfaction rate of the radio cell USR=1−Number of users whose subjective experience is downgraded/Total number of video service users in the radio cell. This numerical value indicates a percentage of satisfied users in the tested cell.

207. Evaluate media data delivery quality of the radio cell according to the subjective experience score of the radio cell resource and the user satisfaction rate of the radio cell.

Further, the media data delivery quality of the radio cell is evaluated according to the subjective experience score of the radio cell resource and the user satisfaction rate of the radio cell. The embodiment of the present invention provides a media delivery quality index for a radio cell, that is, a cell subjective quality index (Cell Voice Quality Enhancement (VQE) Index (CVI)). The cell subjective quality index includes two parameters, namely, radio resource factor and user satisfaction rate. That is, the CVI is identified as RSF:USR.

When the media data delivery quality of the radio cell is evaluated according to the subjective experience score of the radio cell resource and the user satisfaction rate of the radio cell, if the subjective experience score of the radio cell resource at the moment is a full score and meanwhile the user satisfaction rate of the radio cell at the moment is 1, the media data delivery quality of the radio cell at the moment meets the user requirement of the radio cell, that is, the radio resource meets the overall user requirement. When all users are satisfied, CVI is R:1, where R is a maximum value of the subjective quality of the cell resource. Specifically, reference may be made to a 5-point scale or 100-point scale for the MOS. If the subjective experience score of the radio cell resource at the moment is a full score and meanwhile the user satisfaction rate of the radio cell at the moment is not 1, the media data delivery quality of the radio cell at the moment does not meet the user requirement of the radio cell, where the radio cell resource meets the overall requirement of the radio cell but the radio resource is irrationally allocated within the radio cell. For example, among N users in the radio cell, the subjective experience of n users is downgraded, and CVI is R:u, where u=1−n/N, and n<N; if the subjective experience score of the radio cell resource at the moment is not a full score and meanwhile the user satisfaction rate of the radio cell at the moment is not 1, the media data delivery quality of the radio cell at the moment does not meet the user requirement of the radio cell, where the radio cell resource does not meet the overall requirement of the radio cell. For example, the radio resource does not meet the overall user requirement, and among N users in the radio cell, the subjective experience of n users is downgraded, and CVI is r:u, where u=1−n/N, r is the subjective quality of the cell resource and is smaller than R, and n<N.

In the embodiment of the present invention, according to an acquired total throughput of media data transmission in a radio cell and media traffic required by the radio cell, a size of a virtual decoding buffer of the radio cell when the radio cell plays the media data is simulated, it is determined whether a pause occurs in a media data playing process of the radio cell, and a variation of subjective experience of a user in the radio cell at this moment is learnt according to whether a pause occurs in the media data playing process of the radio cell. Then, a radio resource factor of the cell is further acquired, and meanwhile, a user satisfaction rate of the radio cell is counted and acquired, and a media delivery quality index for a radio cell, that is, a cell subjective quality index, is proposed. This index, by using the radio resource factor of the cell and the user satisfaction rate of the radio cell, implements evaluation of the radio cell resource, reflects a subjective experience situation of users within the radio cell, and establishes a relationship between the cell radio resource and the subjective experience of users in the cell.

Embodiment 3

Figure 5:
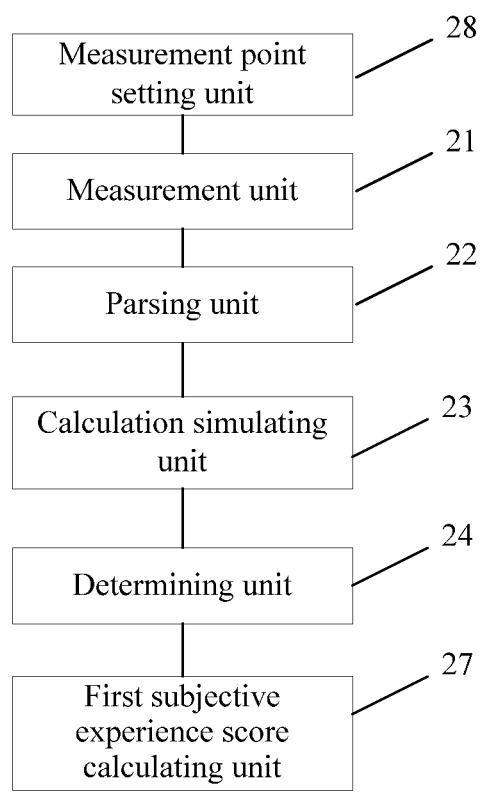
FIG. 5 is a schematic diagram of an apparatus for evaluating media delivery quality apparatus according to an embodiment of the present invention.

This embodiment of the present invention provides an apparatus for evaluating media delivery quality. The apparatus may be located in a terminal device, a network device, or a test device. The apparatus for evaluating media delivery quality may be implemented by using a hardware circuit, or a combination of software and hardware. As shown in FIG. 5, the apparatus includes: a measurement unit 21 configured to receive media data within a period of time, and measure a data amount of the media data received within the period of time; a parsing unit 22 configured to parse the media data, and acquire a play rate of the media data; a calculation simulating unit 23 configured to simulate, according to the data amount of the media data received within the period of time and the play rate of the media data, a decoding buffer in a process of playing the media data received within the period of time, to acquire a virtual decoding buffer and acquire a size of the virtual decoding buffer; and a determining unit 24 configured to determine, according to the size of the virtual decoding buffer, whether a pause occurs in the process of playing the media data received within the period of time.

Figure 6:
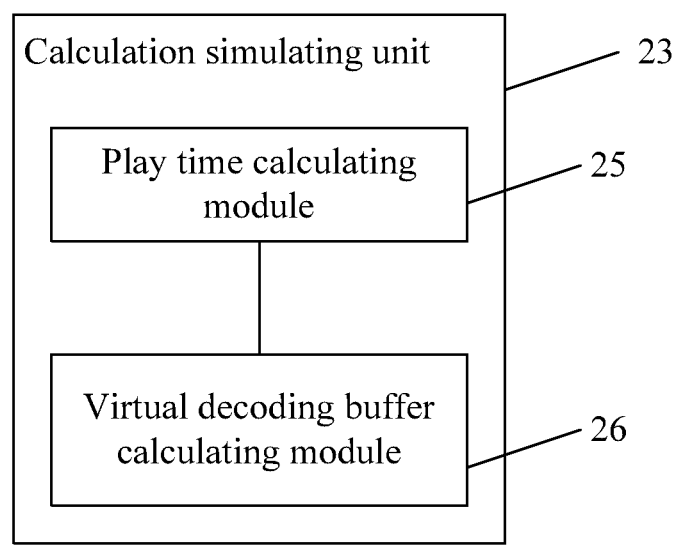
FIG. 6 is a schematic diagram of a calculation simulating unit according to an embodiment of the present invention.

As shown in FIG. 6, the calculation simulating unit 23 includes: a play time calculating module 25 configured to: acquire, according to the data amount of the media data received within the period of time and the play rate of the media data, sustainable play time of the media data received within the period of time; and a virtual decoding buffer calculating module 26 configured to: if any moment within the period of time is within a buffer phase of media data playing, acquire the size of the virtual decoding buffer within the period of time, which is a sum of the size of the virtual decoding buffer before the period of time and the sustainable play time of the media data received within the period of time; and if any moment within the period of time is not within a buffer phase of media data playing, acquire the size of the virtual decoding buffer within the period of time, which is a difference between the sum of the size of the virtual decoding buffer before the period of time and the sustainable play time of the media data received within the period of time and a duration of the period of time.

The determining unit 24 is specifically configured to: if the size of the virtual decoding buffer within the period of time is larger than 0, determine that the media data is normally played within the period of time; and if the size of the virtual decoding buffer within the period of time is smaller than or equal to 0, determine that the media data is played with a pause within the period of time.

Further, the apparatus provided in the embodiment of the present invention further includes: a first subjective experience score calculating unit 27 configured to acquire a subjective experience score on the media data playing according to whether a pause occurs in the process of playing the media data. The first subjective experience score calculating unit 27 is specifically configured to: acquire, according to the time when the pause occurs in the process of playing the media data, a duration of the pause in the process of playing the media data, a duration of an interval between two pauses in the process of playing the media data, and a duration of media data playing between the two pauses in the process of playing the media data; and acquire the subjective experience score on the media data playing at a moment according to the formula $MOS=a_1 \times Duration+a_2 \times Interval+a_3 \times PlayTime$, where MOS is the subjective experience score, $a_1$, $a_2$, and $a_3$ are constants for calculating the subjective experience score, Duration is the duration of the pause in the process of playing the media data, Interval is the duration of the interval between two pauses that are before the moment and are closest to the moment in the process of playing the media data, and PlayTime is the duration of media data playing between the two pauses that are before the moment and are closest to the moment in the process of playing the media data.

The apparatus provided in the embodiment of the present invention further includes: a measurement point setting unit 28 configured to set at least one measurement point on a network used for media data transmission. The measurement point is used to receive media data, and meanwhile measure the received media data and parse the media data. The measurement point is located on a network node or a network terminal on the network used for media data transmission.

Further, in the embodiment of the present invention, the measurement unit 21 is further configured to measure an average arrival duration per frame of the media data received within the period of time.

The parsing unit 22 is further configured to parse the media data, and acquire a frame rate of the media data.

In addition, the apparatus provided in the embodiment of the present invention further includes a theoretical duration per frame calculating unit configured to acquire a theoretical duration per frame of the media data according to the frame rate of the media data; a short pause jitter factor calculating unit configured to acquire, according to the average arrival duration per frame of the media data, a short pause jitter factor of the media data received within the period of time;

and a second subjective experience score calculating unit configured to acquire, according to the subjective experience score of raw data of the media data received within the period of time before transmission and the short pause jitter factor of the media data received within the period of time, the subjective experience score of the media data received within the period of time.

The apparatus provided in the embodiment of the present invention simulates, according to the transmission speed of the media data and the decoding speed of the media data acquired by the evaluation device, a size of a virtual decoding buffer (that is, a throughput factor) in the process of playing the media data at the foregoing data transmission speed and decoding speed, determines whether a pause occurs in the process of playing the media data, learns a variation of subjective experience on the media data in this case according to whether a pause occurs in the process of playing the media data, and then further acquires a subjective experience score, thereby accurately acquiring, on a network node, a variation and a score of subjective experience of a network terminal on the media data.

Embodiment 4

Figure 7:
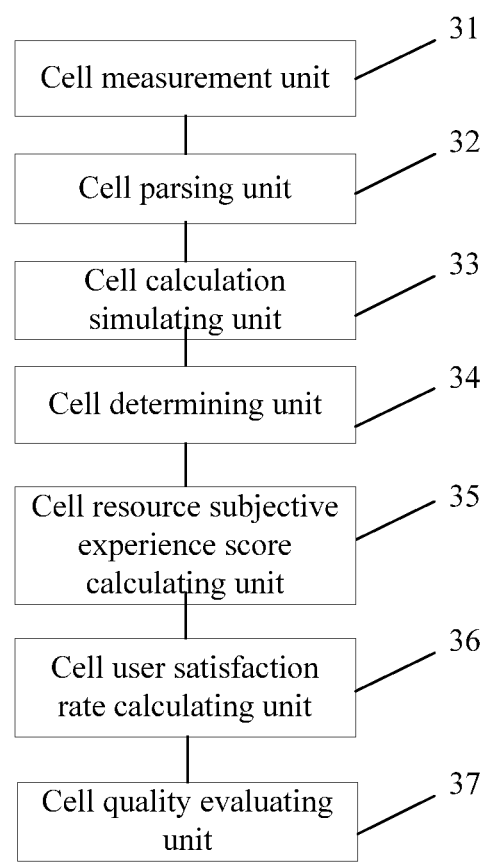
FIG. 7 is a schematic diagram of an apparatus for evaluating media delivery quality of a radio cell according to an embodiment of the present invention.

This embodiment of the prevent invention provides an apparatus for evaluating media delivery quality of a radio cell. As shown in FIG. 7, the apparatus includes: a cell measurement unit 31 configured to measure a data amount of media data received by each user in the radio cell within a period of time and a data amount of media data received by the radio cell within the period of time; a cell parsing unit 32 configured to parse the media data received by the radio cell, and acquire a play rate of the media data and media data traffic required by the radio cell; a cell calculation simulating unit 33 configured to simulate, according to the data amount of the media data received by each user in the radio cell within the period of time and the play rate of the media data, a decoding buffer in a process of playing the media data received by each user in the radio cell within the period of time, to acquire a virtual decoding buffer of each user and acquire a size of the virtual decoding buffer of each user, and simulate, according to the data amount of the media data received by the radio cell within the period of time and the media traffic required by the radio cell, a decoding buffer in a process of playing the media data received by the radio cell within the period of time, to acquire a virtual decoding buffer of the radio cell and acquire a size of the virtual decoding buffer of the radio cell; a cell determining unit 34 configured to determine, according to the size of the virtual decoding buffer of each user, whether a pause occurs in the process of playing the media data received by each user in the radio cell within the period of time, and determine, according to the size of the virtual decoding buffer of the radio cell, whether a pause occurs in the process of playing the media data received by the radio cell within the period of time; a cell resource subjective experience score calculating unit 35 configured to acquire a subjective experience score of each user in the radio cell according to whether a pause occurs in the process of playing the media data received by each user in the radio cell within the period of time, and acquire a subjective experience score of a radio cell resource according to whether a pause occurs in the process of playing the media data received by the radio cell within the period of time; a cell user satisfaction rate calculating unit 36 configured to acquire a user satisfaction rate of the radio cell by using the subjective experience score of each user in the radio cell; and a cell quality evaluating unit 37 configured to evaluate media data delivery quality of the radio cell according to the subjective experience score of the radio cell resource and the user satisfaction rate of the radio cell.

Further, in the embodiment of the present invention, the cell calculation simulating unit 33 includes: a user play time calculating module configured to acquire, according to the data amount of the media data received by each user within the period of time and the play rate of the media data, sustainable play time of the media data received by each user within the period of time; and a user virtual decoding buffer calculating module configured to: if any moment within the period of time is within a buffer phase of media data playing, acquire the size of the virtual decoding buffer of the user within the period of time, which is a sum of the size of the virtual decoding buffer of the user before the period of time and the sustainable play time of the media data received by the user within the period of time; and if any moment within the period of time is not within a buffer phase of media data playing, acquire the size of the virtual decoding buffer of the user within the period of time, which is a difference between the sum of the size of the virtual decoding buffer of the user before the period of time and the sustainable play time of the media data received by the user within the period of time and a duration of the period of time.

Further, in the embodiment of the present invention, the cell calculation simulating unit 33 includes a cell play time calculating module configured to acquire, according to the data amount of the media data received by the radio cell within the period of time and the media data traffic required by the radio cell, sustainable play time of the media data received by the radio cell within the period of time; and a cell virtual decoding buffer calculating module configured to: if any moment within the period of time is within a buffer phase of media data playing, acquire the size of the virtual decoding buffer of the radio cell within the period of time, which is a sum of the size of the virtual decoding buffer of the radio cell before the period of time and the sustainable play time of the media data received by the radio cell within the period of time; and if any moment within the period of time is not within a buffer phase of media data playing, acquire the size of the virtual decoding buffer of the radio cell within the period of time, which is a difference between the sum of the size of the virtual decoding buffer of the radio cell before the period of time and the sustainable play time of the media data received by the radio cell within the period of time and a duration of the period of time.

Further, in the embodiment of the present invention, the cell determining unit 34 is specifically configured to: if the size of the virtual decoding buffer of the user within the period of time is larger than 0, determine that the media data of the user is normally played within the period of time; if the size of the virtual decoding buffer of the user within the period of time is smaller than or equal to 0, determine that the media data of the user is played with a pause within the period of time; if the size of the virtual decoding buffer of the radio cell within the period of time is larger than 0, determine that the media data of the radio cell is normally played within the period of time; and if the size of the virtual decoding buffer of the radio cell within the period of time is smaller than or equal to 0, determine that the media data of the radio cell is played with a pause within the period of time.

Further, in the embodiment of the present invention, the cell subjective experience score calculating unit 35 is specifically configured to: acquire, according to the time when the pause occurs in the process of playing the media data received by each user, a duration of the pause in the process of playing the media data received by the user, a duration of an interval between two pauses in the media data playing process of the user, and a duration of media data playing between the two pauses in the media data playing process of the user; and acquire the subjective experience score of the user at a moment according to the formula MOS=$a_1 \times$ Duration+$a_2 \times$Interval+$a_3 \times$PlayTime, where MOS is the subjective experience score of the user, $a_1$, $a_2$, and $a_3$ are constants for calculating the subjective experience score, Duration is the duration of the pause in the media data playing process of the user, Interval is the duration of the interval between two pauses that are before the moment and are closest to the moment in the media data playing process of the user, and PlayTime is the duration of media data playing between the two pauses that are before the moment and are closest to the moment in the media data playing process of the user; acquire, according to the time when the pause occurs in the media data playing process of the radio cell, a duration of the pause in the media data playing process of the radio cell, a duration of an interval between two pauses in the media data playing process of the radio cell, and a duration of media data playing between the two pauses in the media data playing process of the radio cell; and acquire the subjective experience score of the radio cell resource at a moment according to the formula MOS=$a_1 \times$ Duration+$a_2 \times$Interval+$a_3 \times$PlayTime, where MOS is the subjective experience score of the radio cell resource, $a_1$, $a_2$, and $a_3$ are constants for calculating the subjective experience score, Duration is the duration of the pause in the media data playing process of the radio cell, Interval is the duration of the interval between two pauses that are before the moment and are closest to the moment in the media data playing process of the radio cell, and PlayTime is the duration of media data playing between the two pauses that are before the moment and are closest to the moment in the media data playing process of the radio cell.

Further, in the embodiment of the present invention, the cell user satisfaction rate calculating unit 36 is specifically configured to: separately compare the subjective experience score of each user at the moment with the subjective experience score of each user before the moment, and acquire a user satisfaction rate of the radio cell at the moment by counting the number of users in the radio cell whose subjective experience is downgraded, where the user satisfaction rate of the radio cell at the moment is a difference between 1 and a quotient of the number of users in the radio cell whose subjective experience is downgraded divided by the total number of users in the radio cell.

Further, in the embodiment of the present invention, the cell quality evaluating unit 37 is specifically configured to: if the subjective experience score of the radio cell resource at the moment is a full score, and meanwhile the user satisfaction rate of the radio cell at the moment is 1, determine that the media data delivery quality of the radio cell at the moment meets a user requirement of the radio cell; if the subjective experience score of the radio cell resource at the moment is a full score, and meanwhile the user satisfaction rate of the radio cell at the moment is not 1, determine that the media data delivery quality of the radio cell at the moment does not meet the user requirement of the radio cell, where the radio cell resource meets an overall requirement of the radio cell but a radio resource is irrationally allocated within the radio cell; and if the subjective experience score of the radio cell resource at the moment is not a full score, and meanwhile the user satisfaction rate of the radio cell at the moment is not 1, determine that the media data delivery quality of the radio cell at the moment does not meet the user requirement of the radio cell, where the radio cell resource does not meet the overall requirement of the radio cell.

In the embodiment of the present invention, according to a total throughput of media data transmission in a radio cell and media traffic required by the radio cell, a size of a virtual decoding buffer of the radio cell when the radio cell plays the media data is simulated, it is determined whether a pause occurs in a media data playing process of the radio cell, and a variation of subjective experience of a user in the radio cell at this moment is learnt according to whether a pause occurs in the media data playing process of the radio cell, and then a radio resource factor of the cell is further acquired, and meanwhile, a user satisfaction rate of the radio cell is counted and acquired, and a media delivery quality index for a radio cell is proposed, that is, a cell subjective quality index. This index, by using the radio resource factor of the cell and the user satisfaction rate of the radio cell, implements evaluation the radio cell resource, reflect, a subjective experience situation of users within the radio cell, and establish a relationship between the cell radio resource and the subjective experience of users in the cell.

According to the foregoing description of the embodiments, a person skilled in the art can clearly understand that the present invention may be implemented by software in combination with necessary universal hardware, and certainly may also be implemented by hardware. However, under many circumstances, the former is a preferred embodiment. Based on such an understanding, the technical solutions of the present invention essentially, or the part contributing to the prior art may be implemented in the form of a software product. The computer software product is stored in a readable storage medium, for example, a floppy disk, a hard disk, or an optical disc of a computer, and includes several instructions for instructing a computer device (which may be a personal computer, a server, or a network device) to perform the methods described in the embodiments of the present invention.

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the claims.

What is claimed is:

1. A method for evaluating media delivery quality, comprising:
   receiving media data within a period of time;
   measuring a data amount of the media data received within the period of time;
   parsing the media data;
   acquiring a play rate of the media data;
   performing a simulation process to simulate, according to the data amount of the media data received within the period of time and the play rate of the media data, a decoding buffer in a process of playing the media data received within the period of time, to acquire a virtual decoding buffer and acquire a size of the virtual decoding buffer, wherein in the simulation process further comprises acquiring, according to the data amount of the media data received within the period of time and the play rate of the media data, a sustainable play time of the media data received within the period of time;

determining, according to the size of the virtual decoding buffer, whether a pause occurs in the process of playing the media data received within the period of time; and identifying a location of a fault in a network corresponding to the pause, wherein a plurality of evaluation devices for measuring throughput are placed along the network between a server and a terminal, and wherein the location of the fault in the network is identified based on the throughputs measured by the plurality of evaluation devices.

2. The method according to claim 1, wherein acquiring the size of the virtual decoding buffer comprises:

determining a sum of the size of the virtual decoding buffer before the period of time and the sustainable play time of the media data received within the period of time when any moment within the period of time is within a buffer phase of media data playing; and determining a difference between the sum of the size of the virtual decoding buffer before the period of time and the sustainable play time of the media data received within the period of time and a duration of the period of time when any moment within the period of time is not within the buffer phase of media data playing.

3. The method according to claim 2, wherein determining, according to the size of the virtual decoding buffer, whether the pause occurs in the process of playing the media data received within the period of time specifically comprises:

determining that the media data is normally played within the period of time when the size of the virtual decoding buffer within the period of time is larger than zero; and determining that the media data is played with a pause within the period of time when the size of the virtual decoding buffer within the period of time is smaller than or equal to zero.

4. The method according to claim 3, wherein measuring the data amount of the media data received within the period of time comprises:

detecting an acknowledgment number in an acknowledgment character packet fed back by the terminal within the period of time;

acquiring, by using the acknowledgment number, a data packet of the media data received and acknowledged by the terminal within the period of time; and acquiring, according to the acknowledged data packet, the data amount of the media data received by the terminal within the period of time.

5. An apparatus for evaluating media delivery quality, comprising:

a memory comprising instructions; and at least one hardware processor coupled to the processor that executes the instructions to:

receive media data within a period of time and measure a data amount of the media data received within the period of time;

parse the media data and acquire a play rate of the media data;

perform a simulation process to simulate, according to the data amount of the media data received within the period of time and the play rate of the media data, a decoding buffer in a process of playing the media data received within the period of time, to acquire a virtual decoding buffer and acquire a size of the virtual decoding buffer, wherein in the simulation process further comprises acquiring, according to the data amount of the media data received within the period of time and the play rate of the media data, a sustainable play time of the media data received within the period of time;

determine, according to the size of the virtual decoding buffer, whether a pause occurs in the process of playing the media data received within the period of time; and identify a location of a fault in a network corresponding to the pause, wherein a plurality of evaluation devices for measuring throughput are placed along the network between a server and a terminal, and wherein the location of the fault in the network is identified based on the throughputs measured by the plurality of evaluation devices.

6. The apparatus according to claim 5, wherein acquiring the size of the virtual decoding buffer comprises:

determining a sum of the size of the virtual decoding buffer before the period of time and the sustainable play time of the media data received within the period of time when any moment within the period of time is within a buffer phase while in the process of playing the media data; and determining a difference between the sum of the size of the virtual decoding buffer before the period of time and the sustainable play time of the media data received within the period of time and a duration of the period of time when any moment within the period of time is not within a buffer phase while in the process of playing the media data.

7. The apparatus according to claim 6, wherein the at least one hardware processor further executes the instructions to:

determine that the media data is normally played within the period of time when the size of the virtual decoding buffer within the period of time is larger than zero; and determine that the media data is played with a pause within the period of time when the size of the virtual decoding buffer within the period of time is smaller than or equal to zero.

8. A computer program product comprising computer executable instructions stored on a non-transitory computer readable medium such that when executed by a processor of a device causes the device to:

receive media data within a period of time and measure a data amount of the media data received within the period of time;

parse the media data and acquire a play rate of the media data;

performing a simulation process to simulate, according to the data amount of the media data received within the period of time and the play rate of the media data, a decoding buffer in a process of playing the media data received within the period of time, to acquire a virtual decoding buffer and acquire a size of the virtual decoding buffer, wherein in the simulation process further comprises acquiring, according to the data amount of the media data received within the period of time and the play rate of the media data, a sustainable play time of the media data received within the period of time;

determine, according to the size of the virtual decoding buffer, whether a pause occurs in the process of playing the media data received within the period of time; and identify a location of a fault in a network corresponding to the pause, wherein a plurality of evaluation devices for measuring throughput are placed along the network between a server and a terminal, and wherein the location of the fault in the network is identified based on the throughputs measured by the plurality of evaluation devices.

9. The computer program product according to claim 8, wherein acquiring the size of the virtual decoding buffer comprises:
   determining a sum of the size of the virtual decoding buffer before the period of time and the sustainable play time of the media data received within the period of time when any moment within the period of time is within a buffer phase while in the process of playing the media data; and
   determining a difference between the sum of the size of the virtual decoding buffer before the period of time and the sustainable play time of the media data received within the period of time and a duration of the period of time when any moment within the period of time is not within a buffer phase while in the process of playing the media data.

10. The computer program product according to claim 9, wherein the computer executable instructions further include instructions to:
    determine that the media data is normally played within the period of time when the size of the virtual decoding buffer within the period of time is larger than zero; and
    determine that the media data is played with a pause within the period of time when the size of the virtual decoding buffer within the period of time is smaller than or equal to zero.

11. The computer program product according to claim 9, wherein the computer executable instructions further include instructions to acquire a subjective experience score on the media data according to whether a pause occurs while in the process of playing the media data.

12. The computer program product according to claim 11, wherein the computer executable instructions further include instructions to:
    measure an average arrival duration per frame of the media data received within the period of time;
    parse the media data and acquire a frame rate of the media data;
    acquire, according to the frame rate of the media data, a theoretical duration per frame of the media data;
    acquire, according to the average arrival duration per frame of the media data, a short pause jitter factor of the media data received within the period of time; and
    acquire, according to the subjective experience score of the media data received within the period of time before transmission and the short pause jitter factor of the media data received within the period of time, the subjective experience score of the media data received within the period of time.

\* \* \* \* \*